Patented Jan. 18, 1949

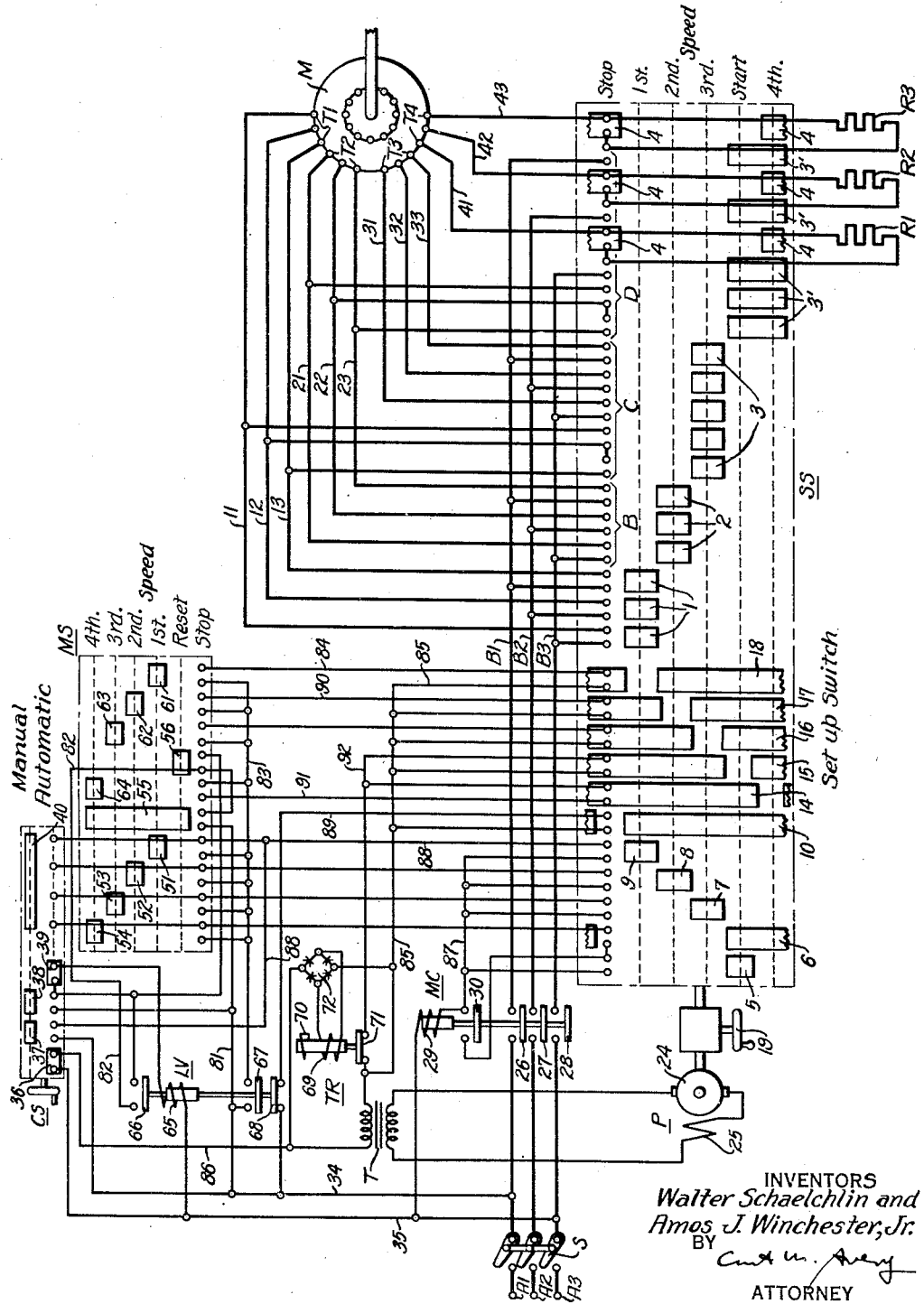

2,459,589

UNITED STATES PATENT OFFICE 2,459,589

CONTROL SYSTEM FOR MULTISPEED ALTERNATING-CURRENT MOTORS

Walter Schaelchlin and Amos J. Winchester, Jr., Pittsburgh, Pa., assignors to Westinghouse Electric Corporation, East Pittsburgh, Pa., a corporation of Pennsylvania Application June 2, 1947, Serial No. 751,798

8 Claims. (Cl. 318—552)

Our invention relates to electric systems and apparatus for controlling multi-speed alternating-current motors of the type in which several windings or winding sections are provided for energizing the motor with respectively different numbers of field poles to operate it at correspondingly different speeds depending upon which winding is energized at a time.

In known control systems of this kind, the selective energization of the motor windings is controlled by a plurality of electromagnetic speed-control contactors, one for each group of motor terminals associated with the respective windings, and these contactors are mechanically interlocked, to prevent the motor from being short-circuited due to sticking of a contactor. The speed-control contactors are connected with a main contactor, timing relays and an operator-actuable master controller to operate in the desired sequential and time relation to one another.

It is an object of our invention to provide a control system for multi-speed alternating-current motors that permits reducing the number of electromagnetic contactors and can be designed for considerably reduced space requirements as compared with the known systems.

It is also an object of our invention to devise a control system of the kind mentioned that provides a mechanical interlock between the connections to all motor windings so that it not only prevents the motor from being short-circuited but also eliminates the possibility of continuously drawing locked rotor current.

Another object of our invention is the provision of a control system for multi-speed alternating-current motors that permits a selective setting for either manual or automatic starting of the motor.

It is also an object of the invention to devise a motor control system which has a minimum number of individual control apparatus so as to reduce the possibility of disturbance and to facilitate locating any such disturbance, thus resulting in reduced over-all maintenance requirements.

Another object of the invention is to provide a motor control system of the kind referred to which is shockproof and hence suitable aboard ship or, generally, for applications where vibrations, shock or impact are to be counted with.

The means, which our invention provides for achieving these and other objects that will be apparent from the following, are set forth and specified by the claims annexed hereto and will be described and explained in detail hereinafter with reference to the embodiment of a motor control system illustrated in the drawing.

The drawing represents schematically the circuit diagram of a control system for an alternating current motor of the squirrel cage type designed for operation at four selective speeds. For instance, in the illustrated embodiment, it is assumed that the motor has two field windings (not shown), each of which is subdivided so that the motor can be energized either with thirty-two field poles for operation at slow (first) speed, with sixteen field poles for operation at twice the minimum speed (second speed), with eight field poles for operation at four times minimum speed (third speed), or with four field poles for operation at eight times minimum speed (fourth or maximum speed). The field windings or winding sections are connected to four groups of field terminals denoted by T1, T2, T3 and T4, respectively. When the motor is to run at slow (first) speed, only the terminal group T1 is to be energized, while the motor will run at second, third or fourth speed when one of the terminal groups T2, T3, T4, respectively, is energized.

The energizing alternating current is supplied from line terminals A1, A2, and A3 through a main switch S which remains closed during the performance of the system. Connected to the main switch are buses B1, B2 and B3, and a set-up switch SS for connecting the buses to one of the motor terminal groups at a time.

The setup switch SS is preferably of the cam operated type, although a drum type switch may also be employed. In the drawing the cams of the switch SS are denoted by 1, 2, 3, 3', 4, 5 to 10, and 14 to 18, respectively. The cams are shown in developed form and the contacts to be opened or closed thereby are represented schematically by contact terminals as is customary in diagrams of this kind. The switch SS can be placed in any one of six positions denoted by "stop," "first," "second," "third," "start," and "fourth." The contacts to be controlled by the cams 1, 2, 3, 3' and 4 are normally open. When the switch is in first position, the cams 1 close the appertaining contacts so that the buses B1, B2, B3 are connected through respective leads 11, 12, 13 to the terminals of group T1. When switch SS is in the second position, the cams 2 close the appertaining contacts so that buses B1, B2, B3 are connected through leads 21, 22, 23, respectively, to the terminals of group T2. In the third position of switch SS, the cams 3 cause the appertaining contacts to connect buses B1, B2, B3 to the leads 31, 32, 33, respectively, of terminal group T3, while the terminals T1 are short-circuited. When the switch SS is in the "start" position, the terminal group T4 is connected through leads 41, 42, 43 to buses B1, B2, B3 in series connection with starting resistors R1, R2 and R3, respectively. With switch SS in fourth position, the cams 4 and 3' cause the appertaining contacts to connect terminals T4 to the buses, while the terminals T2 are short-circuited.

The purpose of the cams denoted by 5 to 10 and 14 to 18 will be referred to in a later place. It will be noted, however, that the contacts appertaining to cams 5 through 9 are normally open, and that these contacts close only in selected positions of the setup switch, while the contacts appertaining to cams 10 and 14 to 18 are normally closed and are opened only when the setup switch is in different respective positions.

The setup switch SS is mechanically connected to a hand wheel 19 or the like manual means for permitting the operator to place the switch in any desired position. The switch SS, however, is also connected to the armature 24 of a pilot motor P whose field winding is denoted by 25. This motor serves to adjust the setup switch in accordance with the setting of a master switch MS which may be located in a remote place and is in condition to control the pilot motor when a control switch CS is placed in "automatic" position. The control switch CS has only one other position denoted by "manual" to which it is to be adjusted when the setup switch SS is to be moved by means of the hand wheel 19.

The connection between the line terminals A1, A2 and A3, aside from the above mentioned main switch S, is controlled by contacts 26, 27 and 28 of an electromagnetic contactor MC whose control coil 29 actuates also an interlock contact 30.

The pilot motor P is energized through a transformer T whose primary circuit receives excitation through leads 34 and 35 from line terminals A1 and A3 under control by the switches CS, MS, and SS. The primary circuit of transformer T, representing the control circuit for the pilot motor P, extends through a contact which is closed by a cam 36 of the control switch CS only when this switch is in the "automatic" position as illustrated. Switch CS has four other cams and appertaining contact means denoted by 37, 38, 39 and 40, respectively.

The master switch MS is preferably also of the cam type and has five positions denoted by "stop," "first," "second," "third" and "fourth." The drawing shows also a position marked "reset." This position is not secured by a reset mechanism. Hence, switch MS is not, as a rule, held in "reset" position but passes through that position when being moved between "stop" and first position and vice versa. It is equipped with contacts and appertaining cams denoted by 51 through 56 and 61 through 64, respectively.

Electrically associated with the control switch and the master switch is a low voltage relay LV whose control coil 65 actuates three contacts denoted by 66, 67 and 68, respectively.

The system timing device which, in the illustrated example includes a direct current relay TR with a main coil 69, a short-circuited coil 70 to provide a delayed drop out performance, and a contact 71. The illustrated timing device is further equipped with a rectifier 72 for energizing the coil 69.

It should be understood that the particular kind of timing device used is not essential to the invention proper and, hence, that other devices than the one shown may be applied, if desired. Likewise, while we prefer using the above-mentioned cam type switches, especially when a shockproof performance is desired, some or all of these switches may be designed in a different way, for instance, as drum contactors, if a high degree of shockproofness is of minor interest.

The illustrated control system includes a number of interconnecting leads, some of which are denoted by numerals 81 through 92 and will be referred to in the following description of the performance of the system.

In the following, for brevity, the contact means appertaining to the switches SS, MS and CS are referred to by the reference numerals of the appertaining control cams.

Assuming the main switch S to be closed, the following functions are performed when the control switch CS is set on "automatic" while the master switch MS, when being moved from "start" to first position, passes through the "reset" position.

Relay LV picks up because its coil 65 is energized in circuit:

$$A1—34—81—55—56—39—65—35—A3 \quad (1)$$

Relay LV closes its contact 66 and seals itself in circuit:

$$A1—34—81—55—82—66—39—65—35—A3 \quad (2)$$

Hence, when thereafter switch MS reaches first position, relay LV stays in, although circuit (1) is then opened at 56.

When switch MS is set on first position, the transformer T for pilot motor P is energized in the control circuit:

$$A1—34—67—83—61—84—18—$$
$$85—T—86—36—35—A2 \quad (3)$$

Motor P then drives switch SS from stop to first position. When that position is reached, contactor MC is picked up since its coil 29 is energized in circuit:

$$A3—35—29—87—9—88—$$
$$51—83—67—34—A1 \quad (4)$$

so that contacts 26, 27, 28 are closed. The control circuit (3) for energizing the pilot motor P is opened in switch SS at 18, so that motor P stops when switch SS is set up for first speed. With that setting of switch SS, contacts 1 connect the leads 11, 12, 13 of terminal group T1 to the buses B1, B2, B3, so that motor M runs at first (slow) speed.

If relay LV drops out, due to voltage failure or when the master switch MS is turned back to "stop," the pilot motor P starts running because transformer T is then energized in the circuit:

$$A1—34—68—89—10—35—$$
$$T—86—36—35—A2 \quad (5)$$

As a result, switch SS starts moving and, at 9, opens the coil circuit (4) of contactor MC. Contacts 26, 27, 28 open and deenergize the motor M, while switch SS continues moving till it reaches the illustrated stop position. In that position, the pilot motor P is stopped because the transformer circuit (5) is then interrupted at 10. In the case of voltage failure, the motor M will not start again when voltage returns to the line unless the master switch MS is first returned to "stop" in order to pick up the relay LV.

When the master switch MS, with motor M running at first speed, is advanced from first to second position, the pilot motor is energized, through transformer T, by the circuit:

A1—34—67—83—62—90—17—
85—T—86—36—35—A3    (6)

Motor P turns the setup switch SS into second position and then stops because circuit (6) is then opened at 17. Motor M is now energized at terminals T2 through the contacts of cam 2 to run at second speed; and contactor MC is now energized through the contact of cams 8.

Turning the master switch MS to third position causes the pilot motor, then energized through the contacts of cams 63 in switch MS and 18 in switch SS, to move the switch SS to third position. Motor M is then energized at terminals T3 through the contacts of cam 3 in switch SS; and contactor MC remains picked up through the contact of cam 9 in switch SS.

When switch MS is further advanced to fourth position, time relay TR opens its contact 71, because rectifier 72 and coil 69 are energized through the contact of cam 64 in switch MS and through the contacts of cams 14 and 15 of switch SS in the circuit:

A1—34—67—83—64—91—14—92—15—
85—72—69—86—36—35—A2    (7)

The pilot motor P starts running because transformer T is energized in parallel to the timing relay elements 72 and 69 of circuit (7). When the setup switch SS reaches the start position, circuit (7) is interrupted at the contact of cam 15 in switch SS so that the transformer T is deenergized, the pilot motor stopped, and the timing relay TR deenergized. Switch SS then remains at rest during the timing interval of the relay TR. During that interval, the contacts of cam 3' connect the motor terminals T4 to the buses B1, B2, B3 in series with the resistors R1, R2, R3, respectively, while shorting the terminals T2. The motor M is now connected for fourth speed, but the load current is limited by the resistors 44, 45, 46 so that transitory starting peaks are cushioned by the resistors. After the elapse of the timing period, relay TR closes contact 71 and completes for the pilot motor P the transformer circuit:

A1—34—67—83—64—91—14—92—
71—T—86—36—35—A2    (8)

Motor P now turns the setup switch SS into fourth position and shorts the resistors R1, R2, R3. Motor M is now directly connected to the line for operation at maximum (fourth) speed.

During the above-described sequence of operations, the main contactor MC behaves as follows. It will be seen from circuit (4) that when the motor M is running at slow (first) speed, the coil 29 of contactor MC is energized in a circuit which includes the contact 51 of the master switch MS and the contact of cam 9 is setup switch SS. Hence, as soon as the master switch MS is moved out of its first position, for instance to second position, the coil circuit (4) of contactor MC is immediately opened at contact 51 in the master switch MS, and the contactor MC drops out and opens the motor load circuit before the setup switch SS moves into second position; and switch SS then recloses the contactor coil circuit (4), except that now this circuit extends through contact of cam 8 in the switch and the contact of cam 52 in switch MS instead of through the contacts of cams 9 and 51. Thus, the contactor MS cuts off the load current immediately before the speed transfer and switches it in again after the circuits are set up for second speed.

Similarly, when the master switch MS is advanced from second to third position, the contactor coil circuit is immediately opened at contact 52 and a new coil circuit is prepared at contact 53 to be completed when the contact of cam 7 in switch SS closes. During transfer from third to fourth speed, the contactor coil circuit is first interrupted at contact 53 of switch SS, then reclosed through contact 54 of switch MS and the contacts of cams 6 and 5 in switch SS. Thus, the setup switch SS is not called upon to interrupt load current since the contactor MS is always effective to perform this duty before the circuits are reset in the setup switch.

In the illustrated example, the master switch MS can be turned from fourth position immediately to "stop." This opens the coil circuit of contactor MC so that the motor M is immediately deenergized. Relay LV drops out because its coil circuit (1) is opened at contact 55 of switch MS. Contact 68 of relay LV closes and energizes the transformer T in circuit:

A1—34—68—89—10—85—T—86—36—35—A2    (9)

Motor P turns the setup switch SS into "stop" position and then stops because circuit (9) is then opened at the contact of cam 10.

It is assumed in the foregoing description of a control sequence, that the master switch MS is turned intermittently from one position to the next. However, the system performs a proper operation also if the motor switch is more rapidly actuated. For instance, if the switch MS is suddenly moved from "stop" to fourth position without holding it in any intermediate position, the following operations occur:

Relay LV picks up in the circuit (1) as switch MS moves through first position, and the relay seals itself in at contact 66. The pilot motor P starts running because its transformer circuit (8) becomes closed at contact member 64. Switch SS now passes sequentially through first, second and third positions to the "start" position. When switch SS reaches "start" position, the pilot motor P is stopped, while resistors R1, R2, R3 are series-connected between the motor terminals T4 and the line terminal, motor P now starts operating. After the timing relay TR has closed its contact 71, switch SS is moved to fourth position and the pilot motor stopped with motor M energized for maximum speed.

When motor M is running, the master switch MS can be turned back in order to decelerate the motor to a selected lower speed or standstill. If desired, a reversible pilot motor and a corresponding design of the switches can be used to make the setup switch turn in the reverse direction for transferring the motor M to lower speed. The illustrated embodiment, however, has a simplified design in which the pilot motor P and the selector switch SS turn always in the same direction. Therefore, when the master switch MS is moved in the reverse direction, for instance from fourth to second position, the pilot motor P advances the switch SS from fourth position through "stop," first and second positions to third position. At the beginning of this movement of switch SS, the coil circuit of contactor MC is interrupted at contact 54 of switch MS so that motor M is immediately deenergized; and the contactor MC picks up again and recloses the motor circuit only when switch SS has reached the third position because the contactor coil circuit is only then completed through contact 53 of switch MS and the contact of cam 7 in switch SS. In the intervening time, the motor M is permitted to coast until it is reenergized at terminals T3 for continued operation at the lower speed.

The system can also be operated by placing the master switch MS into any selected speed position before turning the control switch CS from "manual" to "automatic." When the control switch is subsequently turned to "automatic," the setup switch SS is automatically caused to perform the proper sequential movement into the selected position, while the contactor MC and, as the case may be, the timing relay TR and resistors R1, R2, R3 come into operation as set forth in the foregoing.

With control switch CS set on "manual," the setup switch SS can be actuated manually at crank 19. The contacts of cams 1, 2, 3, 3' and 4 in switch SS are then sequentially operated in the same manner as when the switch SS is driven by the motor P. During such manual actuation, the contacts 51, 52, 53, 54 of switch MS are by-passed by the contact of cam 40 in switch CS so that the contacts of cams 9, 8, 7, 6 and 5 in switch SS energize and deenergize the coil 29 of contactor ML as the setup switch SS passes through the respective positions. Consequently, the motor circuit is opened before each speed transfer and reclosed thereafter in substantially the same manner as during automatic performance, and the duty of interrupting load current is again assigned to the contactor MC rather than to the setup switch. By virtue of the cam-operated setup switch, the system is shockproof to a very high degree. Shocks have no effect on the setting of the setup switch, and any temporary opening of the relay or contactor contacts does not prevent the continuance of the operation determined by the setup switch.

If the motor M is to selectively operate in forward and reverse direction at any of the available speeds, reversing contactors may be added to the illustrated system and may be controlled, for instance, by suitably designed switch means otherwise similar to those described in the foregoing. While we have shown resistors R1, R2, R3 to be effective during the transfer periods between the highest two speeds, similar resistors may also be provided for the transfer between lower speed steps if desired. Conversely, the resistors may be omitted if the conditions of application are such as to render the inherent timing function of the motor-driven setup switch sufficient for all speed transfers. It will therefore be recognized that our invention permits of various alterations, modifications and embodiments other than those specifically shown and described without departing from the principles and essential features disclosed in the foregoing and within the claims annexed hereto.

We claim as our invention:

1. A motor control system comprising a multispeed alternating-current motor having a plurality of terminal groups for operating with different numbers of field poles at different respective speeds depending upon which terminal group is energized at a time, line terminals for supplying alternating current, an electromagnetic contactor having a coil circuit and having contacts controlled by said coil circuit and disposed between said line terminals and said terminal groups, a setup switch adjustable to a plurality of positions and having a plurality of contact means arranged for sequential operation and disposed between said contactor contacts and said terminal groups for connecting said contacts to one of said groups at a time depending upon the selected position of said setup switch, said setup switch having other contact means connected with said coil circuit for temporarily opening said contactor contacts during moving intervals of said setup switch from one to another position so that the interruption of the load current supplied from said line terminal to said motor occurs at said contactor contacts.

2. A motor control system comprising a multispeed alternating-current motor having a plurality of terminal groups for operating with different numbers of field poles at different respective speeds depending upon which terminal group is energized at a time, line terminals for supplying alternating current, an electromagnetic contactor having a coil circuit and having contacts controlled by said coil circuit and disposed between said line terminals and said terminal groups, a setup switch adjustable to a plurality of positions and having a plurality of contact means arranged for sequential operation and disposed between said contactor contacts and said terminal groups for connecting said contacts to one of said groups at a time depending upon the selected position of said setup switch, said setup switch having other contact means connected with said coil circuit for temporarily opening said contactor contacts during moving intervals of said setup switch from one to another position so that the interruption of the load current supplied from said line terminal to said motor occurs at said contactor contacts, a pilot motor in driving connection with said setup switch and having a control circuit, a master switch selectively adjustable to one of a plurality of positions and having a plurality of contact means connected with said control circuit so that said pilot motor is caused to run under control by a selected one of said latter contact means depending upon the selected position of said master switch, said setup switch having another plurality of contact means disposed in said control circuit and correlated to said respective contact means of said master switch so as to cause stopping of said motor when said setup switch is in positional agreement with said master switch.

3. A motor control system comprising a multispeed alternating-current motor having a plurality of terminal groups for operating with different numbers of field poles at different respective speeds depending upon which terminal group is energized at a time, line terminals for supplying alternating current, an electromagnetic contactor having a coil circuit and having contacts controlled by said coil circuit and disposed between said line terminals and said terminal groups, a setup switch adjustable to a plurality of positions and having a plurality of contact means arranged for sequential operation and disposed between said contactor contacts and said terminal groups for connecting said contacts to one of said groups at a time depending upon the selected position of said setup switch, said setup switch having another plurality of contact means of which a selected one is disposed in said coil circuit depending upon the selected position of said setup switch, a pilot motor in driving connection with said setup switch and having a control circuit, a master switch selectively adjustable to one of a plurality of positions and having a plurality of contact means connected with said control circuit so that said pilot motor is caused to run under control by one of said latter contact means depending upon the selected position of said master switch, said setup switch having another plurality of contact means disposed in said control circuit and correlated to said respective contact means of said master switch so as to cause stopping of said motor when said setup switch is in positional agreement with said master switch, said setup switch having another plurality of contact means disposed in said coil circuit in correlation to said respective other plurality of contact means of said master switch so that one of said latter contact means causes said contactor to open its contacts when said master switch is moved from one to another position while one of said other plurality of contact means of said setup switch causes said contactor to close its contacts when said pilot motor has moved said setup switch into positional agreement with said master switch.

4. A motor control system comprising a multi-speed alternating-current motor having a plurality of terminal groups for operating with different numbers of field poles at different respective speeds depending upon which terminal group is energized at a time, line terminals for supplying alternating current, a setup switch adjustable to a plurality of positions and having a plurality of contact means arranged for sequential operation and disposed between said contactor contacts and said terminal groups for connecting said contacts to one of said groups at a time depending upon the selected position of said setup switch, manually actuable means connected with said setup switch for selectively adjusting the latter, a pilot motor in driving connection with said setup switch, motor-control means disposed for operating said pilot motor and including a master control switch having a plurality of positions for selecting the position of said setup switch to be adjusted by said pilot motor, and a control switch selectively adjustable between two positions and having contact means connected with said control means for rendering said control means effective when said control switch is in one position and rendering said control means ineffective to permit manual actuation of said setup switch when said control switch is in the other position.

5. A motor control system comprising a multi-speed alternating-current motor having a plurality of terminal groups for operating with different numbers of field poles at different respective speeds depending upon which terminal group is energized at a time, line terminals for supplying alternating current, an electromagnetic contactor having a coil circuit and having contacts controlled by said coil circuit and disposed between said line terminals and said terminal groups, a setup switch adjustable to a plurality of positions and having a plurality of contact means arranged for sequential operation and disposed between said contactor contacts and said terminal groups for connecting said contacts to one of said groups at a time depending upon the selected position of said setup switch, said setup switch having another plurality of contact means of which one at a time is disposed in said coil circuit depending upon the selected position of said setup switch, a pilot motor in driving connection with said setup switch and having a control circuit, a master switch selectively adjustable to one of a plurality of positions and having a plurality of contact means connected with said control circuit so that said pilot motor is caused to run under control by a different one of said latter contact means at different respective positions of said master switch, said setup switch having another plurality of contact means disposed in said control circuit and correlated to said respective contact means of said master switch so as to cause stopping of said motor when said setup switch is in positional agreement with said master switch, said setup switch having another plurality of contact means disposed in said coil circuit in correlation to said respective other plurality of contact means of said master switch so that one of said latter contact means causes said contactor to open its contacts when said master switch is moved from one to another position while one of said other plurality of contact means of said setup switch causes said contactor to close its contacts when said pilot motor moves said setup switch into positional agreement with said master switch, manually actuable means connected with said setup switch for direct manual adjustment of the latter, and a control switch selectively adjustable between two positions and having contact means for controlling said control circuit to permit its operation only when said control switch is in one position and having contact means for by-passing said other plurality of contact means of said master switch when in the other position to then permit said other plurality of contact means of said setup switch to cause opening and closing of said contactor contacts while said setup switch is manually adjusted from one to another position.

6. A motor control system comprising a multi-speed alternating-current motor having a plurality of terminal groups for operating with different numbers of field poles at different respective speeds depending upon which terminal group is energized at a time, line terminals for supplying alternating current, a setup switch adjustable to a plurality of positions and having a plurality of contact means arranged for sequential operation and disposed between said contactor contacts and said terminal groups for connecting said contacts to one of said groups at a time depending upon the selected position of said setup switch, a pilot motor in driving connection with said setup switch, motor-control means disposed for operating said pilot motor and including a master control switch having a plurality of positions for selecting the position of said setup switch to be adjusted by said pilot motor, said setup switch having contact means connected with said motor control means for stopping said pilot motor in at least one predetermined position, a timing device associated with said control circuit for restarting said pilot motor when said setup switch is in said predetermined position after elapse of the timing period of said device so that the speed of transfer of said variable-speed motor from one to another speed setting is limited in accordance with said timing period.

7. A motor control system comprising a multi-speed alternating-current motor having a plurality of terminal groups for operating with different numbers of field poles at different respective speeds depending upon which terminal group is energized at a time, line terminals for supplying alternating current, a setup switch having a plurality of main positions corresponding to said plurality of terminal groups and having at least one position intermediate two of said main positions, said setup switch having a plurality of contact means arranged for sequential operation and disposed between said line terminals and said terminal groups for connecting said line terminals to one of said groups at a time depending upon the selected main position of said setup switch, a pilot motor in driving connection with said setup switch, motor-control means disposed for operating said pilot motor and including a master control switch having a plurality of positions for selecting the position of said setup switch to be adjusted by said pilot motor, said setup switch having contact means connected with said motor control means for temporarily stopping said pilot motor when said setup switch passes through said intermediate position, a timing device associated with said control circuit for re-starting said pilot motor when said setup switch is in said predetermined position after elapse of the timing period of said device, and resistance means controlled by said setup switch so that, when said setup switch is in said intermediate position, said resistance means are connected between said line terminals and the one of said terminal groups that is energized when said setup switch is in one of its main positions adjacent to said intermediate position.

8. A motor control system comprising a multi-speed alternating-current motor having a plurality of terminal groups for operating with different number of field poles at different respective speeds depending upon which terminal group is energized at a time, line terminals for supplying alternating current, a setup switch having a plurality of main positions corresponding to said plurality of terminal groups and having at least one position intermediate the two main positions correlated to maximum speed and the next lower speed of said variable-speed motor, said setup switch having a plurality of contact means arranged for sequential operation and disposed between said line terminals and said terminal groups for connecting said line terminals to one of said groups at a time depending upon the selected main position of said setup switch, operator-actuable means for selectively adjusting said setup switch to any one of its main positions, resistance means, and contact means forming part of said setup switch and connected with said resistance means for temporarily inserting said resistance means between said line terminals and the terminal group for maximum speed as said setup switch passes through said intermediate position, said latter contact means being arranged to short-circuit said resistance means when said setup switch is in its main position for maximum motor speed.

WALTER SCHAELCHLIN.
AMOS J. WINCHESTER, Jr.

REFERENCES CITED

The following references are of record in the file of this patent:

UNITED STATES PATENTS

| Number | Name | Date |
|---|---|---|
| 873,702 | Alexanderson | Dec. 17, 1907 |
| 1,170,618 | Dudley | Feb. 8, 1916 |
| 1,457,920 | Zweigbergk | June 5, 1923 |
| 2,046,970 | Royer | July 7, 1936 |
| 2,186,254 | Mahnke | Jan. 9, 1940 |